(No Model.) 2 Sheets—Sheet 1.
C. W. & A. S. GAGE.
VENEER CUTTING MACHINE.
No. 300,243. Patented June 10, 1884.
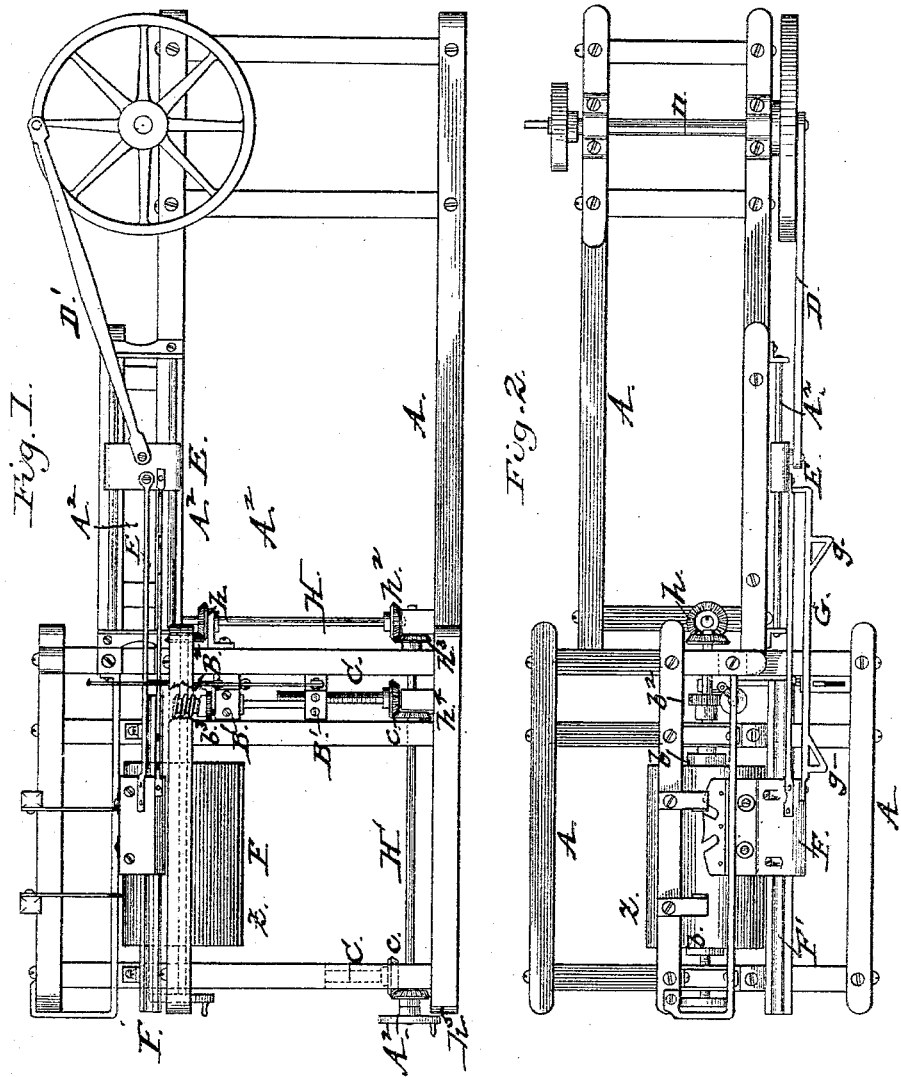
Witnesses:
Wallace E. Ward
John Dougal
Inventors;
Charles W. Gage and
Adelbert S. Gage
per Edw. W. Donn & Co.
Attys.

(No Model.) 2 Sheets—Sheet 2.

C. W. & A. S. GAGE.
VENEER CUTTING MACHINE.

No. 300,243. Patented June 10, 1884.

Witnesses:
Wallace E. Ward
John Dougal

Inventors:
Charles W. Gage and
Adelbert S. Gage
per Edw. W. Down & Co.
Attys.

180# UNITED STATES PATENT OFFICE.

CHARLES W. GAGE AND ADELBERT S. GAGE, OF HOMER, NEW YORK.

VENEER-CUTTING MACHINE.

SPECIFICATION forming part of Letters Patent No. 300,243, dated June 10, 1884.

Application filed January 22, 1884. (No model.)

*To all whom it may concern:*

Be it known that we, CHARLES W. GAGE and ADELBERT S. GAGE, citizens of the United States, residing at Homer, in the county of Cortland and State of New York, have invented certain new and useful Improvements in Machinery for Sawing Lumber; and we do hereby declare the following to be a full, clear, and exact description of the invention, such as will enable others skilled in the art to which it appertains to make and use the same.

Our invention relates to improvements in machines for sawing thin lumber or veneers from the circumference of a log; and the objects of the said improvements have more especial reference to the means for feeding and rotating the log and constructing and adjusting the saw or cutter. The same set of mechanism which rotates the log tends also to elevate it gradually to keep the proper thickness of the lumber at all times, and certain parts of this mechanism are so placed and connected as to increase the rapidity of rotation (or feed) of the log as its radius becomes less by the removal of successive layers from its circumference, so that the work for the saw to do continues the same throughout the entire log. This increase in revolution is brought about automatically and gradually as the radius gradually lessens. The feed devices are also provided with a regulating means, which can be set by hand, in order to vary the amount of feed according to the character of the wood being sawed or the amount of power driving the machinery. The saw reciprocates horizontally, and is set upon an adjustable plate, which may be set forward or back to set the saw to different positions over the log in order to vary the cut. The saw is provided with peculiarly-shaped teeth, which are especially adapted for horizontal work with the grain of the wood, cutting in either direction.

The accompanying drawings illustrate what we consider to be the best means for carrying the invention into practice.

Figure 3:
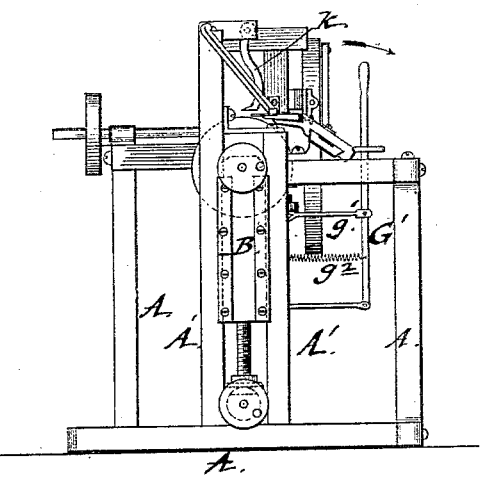
Figure 4:
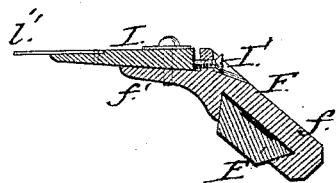
Figure 5:
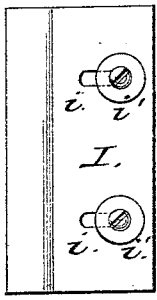
Figure 6:
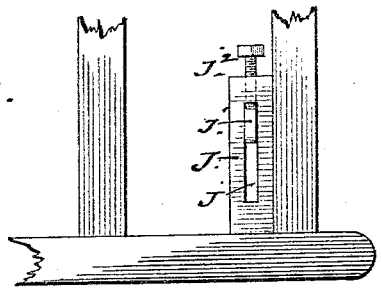
Figure 7:
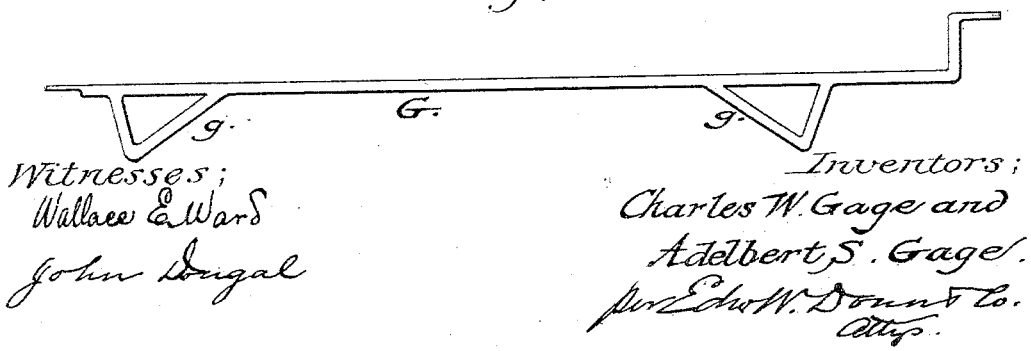

Figure 1 is a side elevation of the machine. Fig. 2 is a plan view of the same. Fig. 3 is an end elevation of the same, taken from the left hand of Figs. 1 and 2. Fig. 4 is a section of the saw-carrying slide set on the way upon which it reciprocates, with the attached adjustable saw-support and saw. Fig. 5 is a plan of the adjustable saw-support; Fig. 6, a detail of the adjusting means for the feed device. Fig. 7 is a detail view of the feed-slide, with the inclines at the ends thereof.

Similar letters of reference indicate corresponding parts in all the figures.

A A, &c., is the stationary frame-work.

A' A' are the vertical supports, in which the head-blocks B B' move up and down. The log is marked Z, and is held in the head-blocks by the end dogs, $b\ b'$. Both of these dogs rotate in the head-blocks. The outer one, $b$, is provided with means for being set up against the end of the log. The inner one, $b'$, is provided with a pinion, $b^2$, which gears into a worm, $B^2$, carried by the head-blocks B'. The head-blocks are elevated and depressed by means of the screws C C', through the medium of a train of gearing and shafting from the feed-lever.

In order to understand this construction and arrangement for elevating the head-blocks and rotating the log, it will be necessary to first describe the means for reciprocating the saw as the feed gets its original impetus from the reciprocating part. Power is derived through the shaft D from any convenient source to drive the machinery. The pitman D' is attached to the slide E, which moves on guides or ways $A^2$, secured to the stationary frame-work. The connecting-rod E' rigidly joins the slide E with the saw-carrying slide F, which works on a guide or way, F'.

The peculiar construction of the details of saw-slide F will be hereinafter described.

Secured to the slides E and F is the feed-rod G, provided with inclines $g\ g$ near each end. A feed-lever, G', pivoted to the frame-work of the machine, has a hook-pawl, $g'$, which works in the ratchet $b^3$, secured on the same shaft with the worm $B^2$. The pawl is drawn forward over the ratchet by the tension of the spring $g^2$. The same spring, $g^2$, holds the lever G' against the rod G. Now, as the rod G is reciprocated and is brought close to one end of the stroke, the incline $g$ forces the top of the lever G' out and causes the pawl $g'$ to turn the ratchet $b^3$. The worm $B^2$ being rotated by the turning of the ratchet, and the worm gearing into the pinion $b^2$, the log is caused to rotate or revolve. The rate of rotation or revolution of the log or block Z will depend upon its circumference, as will hereinafter be explained. The saw being at the end of a stroke at the same time that the incline $g$ strikes the lever G', the revolution of the log (i. e., the feed) will occur between the strokes of the saw; and the inclines being placed at each end of the rod G, the feed will occur at each end of the saw-stroke.

In order to elevate the log so that in taking off a convolute layer the same thickness of plank or lumber shall be preserved regardless of the diminution of radius of the log, the shaft on which the dog $b'$ is secured is provided with a pinion, $h$, which gears into another pinion, $h'$, secured upon the upright shaft H, which is also provided at the lower end with a pinion, $h^2$, which gears into a pinion, $h^3$, on the end of the horizontal shaft H'. This horizontal shaft H' is provided with pinions $h^4$ and $h^5$, which gear into pinions $c$ and $c'$, secured on the screws C and C', which operate in the head-blocks B and B' respectively. By this arrangement it will be seen that the rotation of the log by means of the pinion $b^2$, worm B², ratchet $b^3$, pawl $g'$, and lever G', operated by the feed-rod G $g g$, will cause the screws C and C' to turn, and thereby elevate the head-blocks, through the medium of the shafting and gearing just described.

In order to adjust the height of the log when it is first set in place, the shaft H' is provided with a hand-wheel, H², which may be operated by hand to attain this end. By the same arrangement the log may be lowered, or the dogs for holding the log set in the proper position to receive a new log. The feed-lever G' is attached to the head-block B', and will be elevated or lowered therewith. The position of the lever determines the amount of feed to be given. When a large log is in place to be sawed or cut, the lever G' will be in a low position, so that its throw, as caused by its contact with the inclines $g$, will cause the pawl $g'$ to be drawn only a short distance and the log to be rotated and elevated very slowly. As the head-block is elevated more and more the throw of the lever G' will cause greater and greater action of the pawl $g'$, and will consequently feed and elevate the log with increasing rapidity as its radius becomes less, and the necessity for more rapid rotation in order to give the same amount of feed to the log against the saw. In addition to this automatic regulation of the feed, an arbitrary regulator, J, is placed in the frame-work of the machine. This regulator has a slot, $j$, in which the rod G' works, and a set-block, $j'$, with a screw, $j^2$, is provided, in order to regulate the length of the slot $j$ and the consequent movement of the rod G'. The saw-slide F is provided with a dovetail slot, $f$, on the under side, which rides upon the way F', which is formed to fit in the groove $f$. The slide F is provided with a flat top face, $f'$, on which is secured the adjustable saw-supporting plate I. This plate I is provided with slots $i$ $i$, through which pass the screws $i'$ $i'$, which engage with the slide F. Set-screws I' I', passing through an upright portion of the slide F and bearing against the rear edge of plate I, serve to accurately set the said plate. By this arrangement the wear of the saw can be accurately compensated for, and the cutting-edge of the saw kept in the same line over the log.

Secured to the frame-work of the machine, and extending down to near the saw-line, are the hooks $k$ $k$, which take the edge of the lumber as it is cut, and, as more and more is being cut, carrying it up over the stationary top or bar of the frame, when the board will pass on away from the machine without being caught by any of the working parts.

The saw which we employ is peculiarly adapted for use in the position in which we employ it. It will give a cut both "going" and "coming"—i.e., cutting with the stroke in each direction. For this purpose the saw, which is marked L, is provided with a double cutting-tooth, $l$, having points $l'$ $l'$ set in opposite directions, either of which will cut the lumber when it is reciprocated. The edges or corners of the saw $l^2$ are rounded off, as shown, so as to insure that they shall not come in contact with the log. More than one double tooth may be used upon the saw.

The saw is firmly secured to the plate I and adjusted therewith, as and for the purpose hereinbefore described.

In practice the log is intended to revolve in a tank of hot water, and the device provided with jets for delivering steam at the point of the cut, in order to soften and toughen the wood.

Modifications may be made in many of the details without departing from the principle or sacrificing the advantages of our invention.

Having thus described our invention, what we desire to claim and secure by Letters Patent is—

1. In a machine for sawing or cutting lumber from a log in convolute layers, mechanism, substantially as described, for simultaneously rotating and gradually elevating the log, said mechanism consisting of a screw or screws for elevating and a worm or analogous means for rotating, said parts engaging with the log-support and operated through proper mechanical connections by the reciprocation of the saw-slide, as set forth.

2. In a machine for sawing veneers, the combination of the reciprocating rod G, having the inclines $g$ $g$, feed-lever G', dog $g'$, ratchet for it to work upon, and mechanical connections to log-support for rotating the log, substantially as set forth.

3. In a machine for sawing veneers, the combination of the reciprocating feed-rod G, having the inclines $g$ $g$ at both ends, pivoted feed-lever G', and connections to the log-supports for rotating the same, with gear and shaft connections to the screws C C', whereby the log is both rotated and elevated at the same time by the reciprocation of the rod G, substantially as set forth.

4. In a machine for sawing veneers from a log in convolute layers, wherein the log is fed by being elevated and rotated simultaneously, the combination of the reciprocating feed-rod G, having the inclines $g\,g$, and the feed-lever G′, secured to a part of the machine which is elevated and lowered with the log, so that the throw of the lever may be varied as the radius of the log is changed, and the said log caused to be fed with equal rapidity at all times.

5. The combination of the feed-lever G′, feed-dog $g'$, attached thereto, and ratchet on which it operates, and means for operating said lever, of the regulator J, having the slot $j$, set-block $j'$, and screw $j^2$, for arbitrarily regulating the throw of the lever, as set forth.

6. In a machine for sawing lumber from a log in convolute layers, the combination, with the saw or cutter and supporting-frame of the hooks $k\,k$, placed above the logs, for receiving the edge of the lumber as it leaves the log, substantially as set forth.

7. A saw-slide provided with the adjustable plate I, resting on a plane surface on the top thereof, said plate having the slots $i\,i$, adapted to receive the pinching-screws $i'\,i'$, and the slide being provided with the set-screws I′, passing through the rear wall thereof, behind the adjustable plate, and serving to set said plate.

In testimony whereof we affix our signatures in presence of two witnesses.

CHARLES W. GAGE.
ADELBERT S. GAGE.

Witnesses:
ZELORA HOAG,
WM. F. HITCHCOCK.